United States Patent [19]
Datta et al.

[11] Patent Number: 5,748,781
[45] Date of Patent: May 5, 1998

[54] METHOD AND APPARATUS FOR DIGITAL DATA COMPRESSION

[75] Inventors: Utpal Datta, Bedford; David G. Carlson, Nashua, both of N.H.

[73] Assignee: Cabletron Systems, Inc., Rochester, N.H.

[21] Appl. No.: 368,414

[22] Filed: Jan. 4, 1995

[51] Int. Cl.$^6$ .................................................. G06K 9/36
[52] U.S. Cl. ........................... 382/232; 382/197; 382/201; 345/121
[58] Field of Search ........................ 382/232, 197, 382/235, 202, 203, 201; 345/121

[56] References Cited

U.S. PATENT DOCUMENTS

| | | | |
|---|---|---|---|
| 4,669,097 | 5/1987 | Bristol | 375/122 |
| 4,841,292 | 6/1989 | Zeno | 345/121 |
| 4,949,281 | 8/1990 | Hillenbrand et al. | 382/197 |

FOREIGN PATENT DOCUMENTS

| | | | |
|---|---|---|---|
| 1 532 945 | 12/1989 | U.S.S.R. | G06F 1/02 |

OTHER PUBLICATIONS

Shridhar et al., "Analysis Of ECG Data For Data Compression," International Journal Of Bio–Medical Computing, vol. 10, No. 2, pp. 113–128 (Mar. 1979, Netherlands).

Iparraguirre, "New And Efficient Data Compression Algorithm," International Journal Of Electronics, vol. 57, No. 4, pp. 479–490 (Oct. 1984, UK).

Andrews et al., "Adaptive Data Compression," Proceedings Of the IEEE, vol. 55, No. 3, pp. 267–277 (Mar. 1967).

Sandman et al., "Third Order Polynomial—Its Use In Data Compression," Signal Processing, vol. 15, No. 4, pp. 405–418, (Dec. 1988, Netherlands).

Fred Halsall, "Data Communications, Computer Networks and Open Systems," Section 3.6 Data Compression, pp. 113–129, 3rd ed., Addison–Wesley Publishing Co., 1992.

*Primary Examiner*—Jose L. Couso
*Assistant Examiner*—Anh Hong Do
*Attorney, Agent, or Firm*—Wolf, Greenfield & Sacks, P.C.

[57] ABSTRACT

Data compression and decompression are performed on a series of data points, by expressing a plurality of data points as an equation or a series of equations. Variable accuracies, and accordingly variable compression ratios, may be provided. Multiple versions of the compressed data, with corresponding multiple accuracy levels, and resulting multiple decompressions may be displayed for comparison. The method and apparatus may be used for storing network statistical data.

27 Claims, 14 Drawing Sheets

MODEL 40051a, ATTRIBUTE 10089, EXPANDED VALUE - 14347
MODEL 40051a, ATTRIBUTE 10089, EXPANDED VALUE - 14347
MODEL 40051a, ATTRIBUTE 10089, EXPANDED VALUE - 14348
MODEL 40051a, ATTRIBUTE 10089, EXPANDED VALUE - 14348
MODEL 40051a, ATTRIBUTE 10089, EXPANDED VALUE - 14348
MODEL 40051a, ATTRIBUTE 10089, EXPANDED VALUE - 14348
MODEL 40051a, ATTRIBUTE 10089, EXPANDED VALUE - 14348
MODEL 40051a, ATTRIBUTE 10089, EXPANDED VALUE - 14348
MODEL 40051a, ATTRIBUTE 10089, EXPANDED VALUE - 14348
MODEL 40051a, ATTRIBUTE 10089, EXPANDED VALUE - 14348
MODEL 40051a, ATTRIBUTE 10089, EXPANDED VALUE - 14348
MODEL 40051a, ATTRIBUTE 10089, EXPANDED VALUE - 14348
MODEL 40051a, ATTRIBUTE 10089, EXPANDED VALUE - 14348
MODEL 40051a, ATTRIBUTE 10089, EXPANDED VALUE - 14348
MODEL 40051a, ATTRIBUTE 10089, EXPANDED VALUE - 14348
MODEL 40051a, ATTRIBUTE 10089, EXPANDED VALUE - 14349
MODEL 40051a, ATTRIBUTE 10089, EXPANDED VALUE - 14349
MODEL 40051a, ATTRIBUTE 10089, EXPANDED VALUE - 14349
MODEL 40051a, ATTRIBUTE 10089, EXPANDED VALUE - 14350
MODEL 40051a, ATTRIBUTE 10089, EXPANDED VALUE - 14350
MODEL 40051a, ATTRIBUTE 10089, EXPANDED VALUE - 14350
MODEL 40051a, ATTRIBUTE 10089, EXPANDED VALUE - 14351
MODEL 40051a, ATTRIBUTE 10089, EXPANDED VALUE - 14360
MODEL 40051a, ATTRIBUTE 10089, EXPANDED VALUE - 14360
MODEL 40051a, ATTRIBUTE 10089, EXPANDED VALUE - 14364
MODEL 40051a, ATTRIBUTE 10089, EXPANDED VALUE - 14382
MODEL 40051a, ATTRIBUTE 10089, EXPANDED VALUE - 14385
MODEL 40051a, ATTRIBUTE 10089, EXPANDED VALUE - 14389
MODEL 40051a, ATTRIBUTE 10089, EXPANDED VALUE - 14389
MODEL 40051a, ATTRIBUTE 10089, EXPANDED VALUE - 14398
MODEL 40051a, ATTRIBUTE 10089, EXPANDED VALUE - 14401
MODEL 40051a, ATTRIBUTE 10089, EXPANDED VALUE - 14401
MODEL 40051a, ATTRIBUTE 10089, EXPANDED VALUE - 14401
MODEL 40051a, ATTRIBUTE 10089, EXPANDED VALUE - 14401
MODEL 40051a, ATTRIBUTE 10089, EXPANDED VALUE - 14402
MODEL 40051a, ATTRIBUTE 10089, EXPANDED VALUE - 14402
MODEL 40051a, ATTRIBUTE 10089, EXPANDED VALUE - 14402
MODEL 40051a, ATTRIBUTE 10089, EXPANDED VALUE - 14402
MODEL 40051a, ATTRIBUTE 10089, EXPANDED VALUE - 14402
MODEL 40051a, ATTRIBUTE 10089, EXPANDED VALUE - 14402
MODEL 40051a, ATTRIBUTE 10089, EXPANDED VALUE - 14402
MODEL 40051a, ATTRIBUTE 10089, EXPANDED VALUE - 14402
MODEL 40051a, ATTRIBUTE 10089, EXPANDED VALUE - 14402
MODEL 40051a, ATTRIBUTE 10089, EXPANDED VALUE - 14402
MODEL 40051a, ATTRIBUTE 10089, EXPANDED VALUE - 14402
MODEL 40051a, ATTRIBUTE 10089, EXPANDED VALUE - 14402
MODEL 40051a, ATTRIBUTE 10089, EXPANDED VALUE - 14402
MODEL 40051a, ATTRIBUTE 10089, EXPANDED VALUE - 14402
MODEL 40051a, ATTRIBUTE 10089, EXPANDED VALUE - 14402
MODEL 40051a, ATTRIBUTE 10089, EXPANDED VALUE - 14402

FIG. 10(a)

```
MODEL 4005la, ATTRIBUTE 10089, EXPANDED VALUE - 14402
MODEL 4005la, ATTRIBUTE 10089, EXPANDED VALUE - 14402
MODEL 4005la, ATTRIBUTE 10089, EXPANDED VALUE - 14403
MODEL 4005la, ATTRIBUTE 10089, EXPANDED VALUE - 14406
MODEL 4005la, ATTRIBUTE 10089, EXPANDED VALUE - 14406
MODEL 4005la, ATTRIBUTE 10089, EXPANDED VALUE - 14406
MODEL 4005la, ATTRIBUTE 10089, EXPANDED VALUE - 14406
MODEL 4005la, ATTRIBUTE 10089, EXPANDED VALUE - 14406
MODEL 4005la, ATTRIBUTE 10089, EXPANDED VALUE - 14412
MODEL 4005la, ATTRIBUTE 10089, EXPANDED VALUE - 14412
MODEL 4005la, ATTRIBUTE 10089, EXPANDED VALUE - 14412
MODEL 4005la, ATTRIBUTE 10089, EXPANDED VALUE - 14412
MODEL 4005la, ATTRIBUTE 10089, EXPANDED VALUE - 14412
MODEL 4005la, ATTRIBUTE 10089, EXPANDED VALUE - 14412
MODEL 4005la, ATTRIBUTE 10089, EXPANDED VALUE - 14412
MODEL 4005la, ATTRIBUTE 10089, EXPANDED VALUE - 14412
MODEL 4005la, ATTRIBUTE 10089, EXPANDED VALUE - 14425
MODEL 4005la, ATTRIBUTE 10089, EXPANDED VALUE - 14425
MODEL 4005la, ATTRIBUTE 10089, EXPANDED VALUE - 14425
MODEL 4005la, ATTRIBUTE 10089, EXPANDED VALUE - 14425
MODEL 4005la, ATTRIBUTE 10089, EXPANDED VALUE - 14425
MODEL 4005la, ATTRIBUTE 10089, EXPANDED VALUE - 14425
MODEL 4005la, ATTRIBUTE 10089, EXPANDED VALUE - 14425
MODEL 4005la, ATTRIBUTE 10089, EXPANDED VALUE - 14427
MODEL 4005la, ATTRIBUTE 10089, EXPANDED VALUE - 14427
MODEL 4005la, ATTRIBUTE 10089, EXPANDED VALUE - 14427
MODEL 4005la, ATTRIBUTE 10089, EXPANDED VALUE - 14427
MODEL 4005la, ATTRIBUTE 10089, EXPANDED VALUE - 14427
MODEL 4005la, ATTRIBUTE 10089, EXPANDED VALUE - 14427
MODEL 4005la, ATTRIBUTE 10089, EXPANDED VALUE - 14427
MODEL 4005la, ATTRIBUTE 10089, EXPANDED VALUE - 14433
MODEL 4005la, ATTRIBUTE 10089, EXPANDED VALUE - 14433
MODEL 4005la, ATTRIBUTE 10089, EXPANDED VALUE - 14433
MODEL 4005la, ATTRIBUTE 10089, EXPANDED VALUE - 14434
MODEL 4005la, ATTRIBUTE 10089, EXPANDED VALUE - 14435
MODEL 4005la, ATTRIBUTE 10089, EXPANDED VALUE - 14435
MODEL 4005la, ATTRIBUTE 10089, EXPANDED VALUE - 14435
MODEL 4005la, ATTRIBUTE 10089, EXPANDED VALUE - 14435
MODEL 4005la, ATTRIBUTE 10089, EXPANDED VALUE - 14435
MODEL 4005la, ATTRIBUTE 10089, EXPANDED VALUE - 14435
MODEL 4005la, ATTRIBUTE 10089, EXPANDED VALUE - 14436
MODEL 4005la, ATTRIBUTE 10089, EXPANDED VALUE - 14438
MODEL 4005la, ATTRIBUTE 10089, EXPANDED VALUE - 14438
MODEL 4005la, ATTRIBUTE 10089, EXPANDED VALUE - 14438
MODEL 4005la, ATTRIBUTE 10089, EXPANDED VALUE - 14438
MODEL 4005la, ATTRIBUTE 10089, EXPANDED VALUE - 14440
MODEL 4005la, ATTRIBUTE 10089, EXPANDED VALUE - 14442
MODEL 4005la, ATTRIBUTE 10089, EXPANDED VALUE - 14443
MODEL 4005la, ATTRIBUTE 10089, EXPANDED VALUE - 14443
MODEL 4005la, ATTRIBUTE 10089, EXPANDED VALUE - 14444
MODEL 4005la, ATTRIBUTE 10089, EXPANDED VALUE - 14444
MODEL 4005la, ATTRIBUTE 10089, EXPANDED VALUE - 14444
MODEL 4005la, ATTRIBUTE 10089, EXPANDED VALUE - 14446
MODEL 4005la, ATTRIBUTE 10089, EXPANDED VALUE - 14446
```

FIG. 10(b)

MODEL 40051a, ATTRIBUTE 10089, EXPANDED VALUE - 14446
MODEL 40051a, ATTRIBUTE 10089, EXPANDED VALUE - 14446
MODEL 40051a, ATTRIBUTE 10089, EXPANDED VALUE - 14446
MODEL 40051a, ATTRIBUTE 10089, EXPANDED VALUE - 14447
MODEL 40051a, ATTRIBUTE 10089, EXPANDED VALUE - 14447
MODEL 40051a, ATTRIBUTE 10089, EXPANDED VALUE - 14447
MODEL 40051a, ATTRIBUTE 10089, EXPANDED VALUE - 14447
MODEL 40051a, ATTRIBUTE 10089, EXPANDED VALUE - 14451
MODEL 40051a, ATTRIBUTE 10089, EXPANDED VALUE - 14451
MODEL 40051a, ATTRIBUTE 10089, EXPANDED VALUE - 14451
MODEL 40051a, ATTRIBUTE 10089, EXPANDED VALUE - 14451
MODEL 40051a, ATTRIBUTE 10089, EXPANDED VALUE - 14451
MODEL 40051a, ATTRIBUTE 10089, EXPANDED VALUE - 14451
MODEL 40051a, ATTRIBUTE 10089, EXPANDED VALUE - 14451
MODEL 40051a, ATTRIBUTE 10089, EXPANDED VALUE - 14451
MODEL 40051a, ATTRIBUTE 10089, EXPANDED VALUE - 14451
MODEL 40051a, ATTRIBUTE 10089, EXPANDED VALUE - 14451
MODEL 40051a, ATTRIBUTE 10089, EXPANDED VALUE - 14451
MODEL 40051a, ATTRIBUTE 10089, EXPANDED VALUE - 14451

FIG. 10(c)

```
MODEL 40051a, ATTRIBUTE 10089, COMPRESSED NODE - 14347, 0.000000, 1
MODEL 40051a, ATTRIBUTE 10089, COMPRESSED NODE - 14348, 0.000000, 14
MODEL 40051a, ATTRIBUTE 10089, COMPRESSED NODE - 14349, 0.000000, 3
MODEL 40051a, ATTRIBUTE 10089, COMPRESSED NODE - 14350, 0.000000, 2
MODEL 40051a, ATTRIBUTE 10089, COMPRESSED NODE - 14351, 9.000000, 1
MODEL 40051a, ATTRIBUTE 10089, COMPRESSED NODE - 14360, 4.000000, 1
MODEL 40051a, ATTRIBUTE 10089, COMPRESSED NODE - 14382, 3.000000, 1
MODEL 40051a, ATTRIBUTE 10089, COMPRESSED NODE - 14389, 0.000000, 1
MODEL 40051a, ATTRIBUTE 10089, COMPRESSED NODE - 14398, 3.000000, 1
MODEL 40051a, ATTRIBUTE 10089, COMPRESSED NODE - 14401, 0.000000, 3
MODEL 40051a, ATTRIBUTE 10089, COMPRESSED NODE - 14402, 0.000000, 23
MODEL 40051a, ATTRIBUTE 10089, COMPRESSED NODE - 14403, 3.000000, 1
MODEL 40051a, ATTRIBUTE 10089, COMPRESSED NODE - 14406, 0.000000, 4
MODEL 40051a, ATTRIBUTE 10089, COMPRESSED NODE - 14412, 0.000000, 9
MODEL 40051a, ATTRIBUTE 10089, COMPRESSED NODE - 14425, 0.000000, 7
MODEL 40051a, ATTRIBUTE 10089, COMPRESSED NODE - 14427, 0.000000, 7
MODEL 40051a, ATTRIBUTE 10089, COMPRESSED NODE - 14433, 0.000000, 2
MODEL 40051a, ATTRIBUTE 10089, COMPRESSED NODE - 14434, 1.000000, 1
MODEL 40051a, ATTRIBUTE 10089, COMPRESSED NODE - 14435, 0.000000, 5
MODEL 40051a, ATTRIBUTE 10089, COMPRESSED NODE - 14436, 2.000000, 1
MODEL 40051a, ATTRIBUTE 10089, COMPRESSED NODE - 14438, 0.000000, 2
MODEL 40051a, ATTRIBUTE 10089, COMPRESSED NODE - 14440, 2.000000, 1
MODEL 40051a, ATTRIBUTE 10089, COMPRESSED NODE - 14443, 0.000000, 1
MODEL 40051a, ATTRIBUTE 10089, COMPRESSED NODE - 14444, 0.000000, 2
MODEL 40051a, ATTRIBUTE 10089, COMPRESSED NODE - 14446, 0.000000, 4
MODEL 40051a, ATTRIBUTE 10089, COMPRESSED NODE - 14447, 0.000000, 3
MODEL 40051a, ATTRIBUTE 10089, COMPRESSED NODE - 14451, 0.000000, 13
```

FIG. 11

METHOD AND APPARATUS FOR DIGITAL DATA COMPRESSION

FIELD OF THE INVENTION

This invention relates generally to data processing and more particularly to digital data compression and reproduction. It is particularly useful for the collection of network statistical data.

BACKGROUND OF THE INVENTION

Existing methods of network statistical data collection normally poll the managed devices (i.e., network or end system nodes) for statistics and store them in a database/archive as statistical records. When the amount of data to be stored or communicated increases, the amount of processing, memory and communications resources required also increases. It would be desirable to decrease the amount of resources necessary to store and communicate data. Currently however, none of the network management products are known to store statistical data in a compressed form and reproduce them on demand.

Without data compression, for an exemplary set of 1000 data points the data content of each point is stored, resulting in storage of 1000 data points. The individual storage of these data points requires a certain amount of memory. If the data points were compressed and then stored, less memory would be required. The ratio of the amount of memory required if no compression is performed, to the amount of memory required if compression is performed, is known as the "compression ratio".

Several methods currently exist for compressing data. The data is usually divided into a string of symbols such as binary words, bytes, or ASCII characters, and the resulting string of symbols is divided into substrings of symbols. In general, the division of the input data stream into substrings is performed so that each substring is the longest string for which there is an identical substring in the input data stream. Short codes may then be developed which represent the substrings. In order that compressed data may be decompressed or reproduced, a dictionary is built as the substrings are replaced, linking each substring with the code that replaces it.

A first type of data compression method builds the dictionary from substrings for which matches have been found, for example substrings which occur more than once in the input data stream. The codes refer to locations in this dictionary, so that the substrings may be reproduced from the dictionary. Often, the dictionary of substrings is stored following the codes and the unmatched substrings.

The codes often comprise an ordered pair of values representing an offset and a length. The offset indicates the number of symbols between the substring (replaced by the code) and the location of the first symbol of the substring in the dictionary. The length indicates the number of symbols in the substring. The codes may also be referred to as pointers or indexes.

A second type of data compression method uses an existing dictionary, instead of building a new dictionary. This existing dictionary may be fixed, or it may have been built in a previous data compression of the first type. If it was built in a previous data compression, a buffer memory is reserved for retaining some portion of the previously compressed data which will be used as the dictionary. As in the first type, substrings are replaced by codes which reference the location of the replaced substring in the dictionary.

Accordingly, the first type and second type of methods only require storage space for one occurrence of a substring which may occur several times in an input data stream. However, a disadvantage of these methods is that the data compression ratio is often only in the range of 2 to 4.

Furthermore, these methods do not allow variable or multiple accuracy levels. Multiple accuracy levels enable higher data compression ratios where an accuracy below 100% is acceptable.

It is an object of the present invention to achieve a high compression ratio for the compression of digital data, such as network statistical data.

It is a further object to allow an externally-specified accuracy level for the reproduction of compressed data, to enable higher compression ratios when lower accuracy levels are sufficient.

It is a further object to allow an external device or user to evaluate the relative performance of different accuracy levels applied to the same data.

SUMMARY OF THE INVENTION

In order to achieve one or more of the foregoing objectives, the present invention includes a method and apparatus for compressing data by expressing a series of data points as an equation or a series of equations. Each equation describes a segment of the data series, which is then stored as a compressed node. A new equation may be initiated whenever a data point falls outside an allowable range for the next predicted point (according to the previous equation). In one embodiment, the equations are linear equations, with a "current slope" determined to be the slope between two adjacent data points in the data series, and a "current average slope" as a rolling average of all previous current slopes of an equation. The allowable range is determined from a desired accuracy level and the current average slope.

The invention further includes a method and apparatus for reproducing data. Reproduced data points are determined to be a sum of the first data point and a product of a counter multiplied by the current average slope. The counter is incremented to reproduce additional data points.

Furthermore, the invention enables variable accuracy which facilitates very high compression ratios in some instances. Additionally, it allows externally-specified accuracies.

In one embodiment, multiple accuracy levels are enabled, and raw data is compressed and stored. The data is then reproduced at different accuracy levels, and a display is provided for comparing the results of different accuracy levels.

Another embodiment provides a method and apparatus for monitoring a network, and compressing and storing network statistical data.

Further embodiments include a computer that performs the functions of several embodiments, as well as a memory device for providing instructions to a computer, so that the computer can perform the functions of the several embodiments.

These and other objects of the present invention will be more particularly described in the following drawings and detailed description.

BRIEF DESCRIPTION OF THE FIGURES

FIGS. 10(a), 10(b), and 10(c) show data in an uncompressed format.

FIG. 11 shows compressed data according to this invention, which corresponds to the data shown in FIGS. 10(a–c).

DETAILED DESCRIPTION

According to the method of this invention, a series of data consisting of data points is received and divided into segments which are represented by equations. Each segment is then stored as a node, instead of storing each data point individually.

Figure 1:
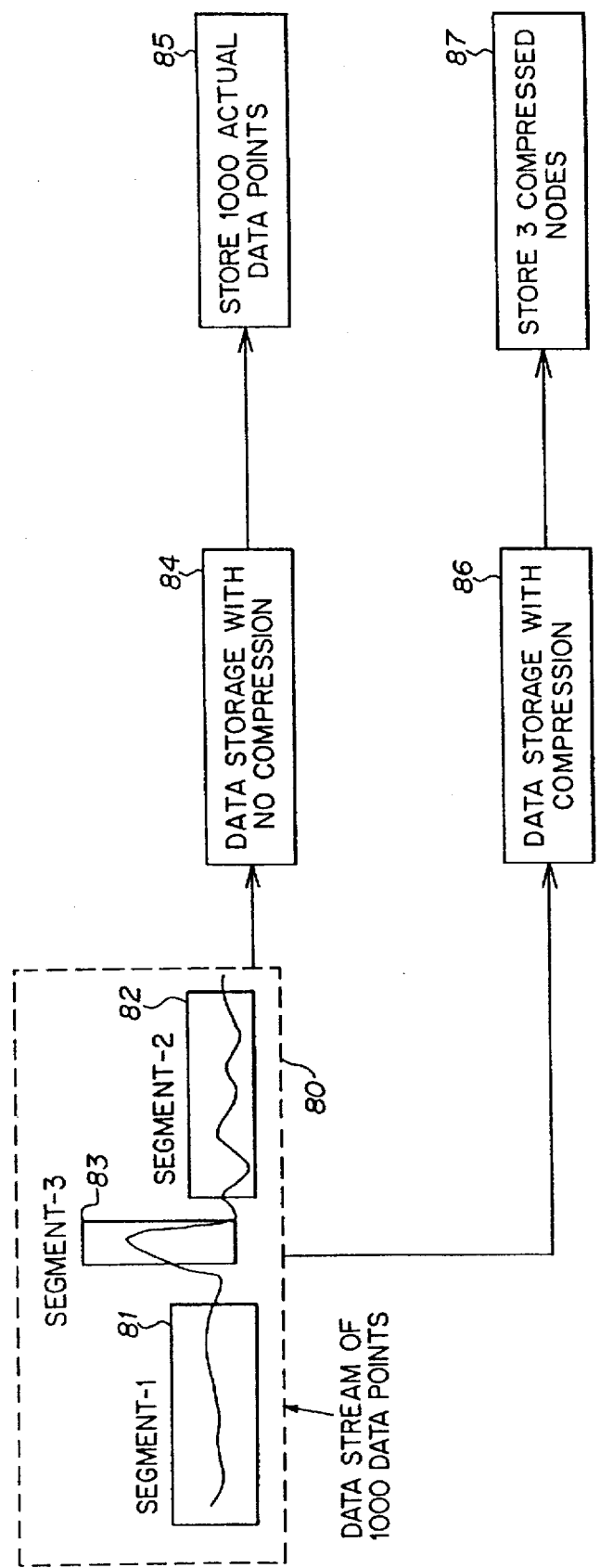
FIG. 1 shows two process flows, one relating to a conventional method of data storage, and one for data storage according to the invention.

FIG. 1 illustrates the data compression process of this invention, compared to a prior art process. A data series or stream 80 of 1000 data points includes three segments: a first segment 81, a second segment 82, and a third segment 83. These segments are defined by adjacent data points being within an allowable range of a current average slope for a segment as discussed further below. Data storage with no compression 84 (according to the prior art) results in the storage of 1000 individual data points 85, while data storage with compression 86 (the present invention) results in the storage of only 3 compressed nodes 87, corresponding to the three segments 81, 82, and 83.

Figure 2:
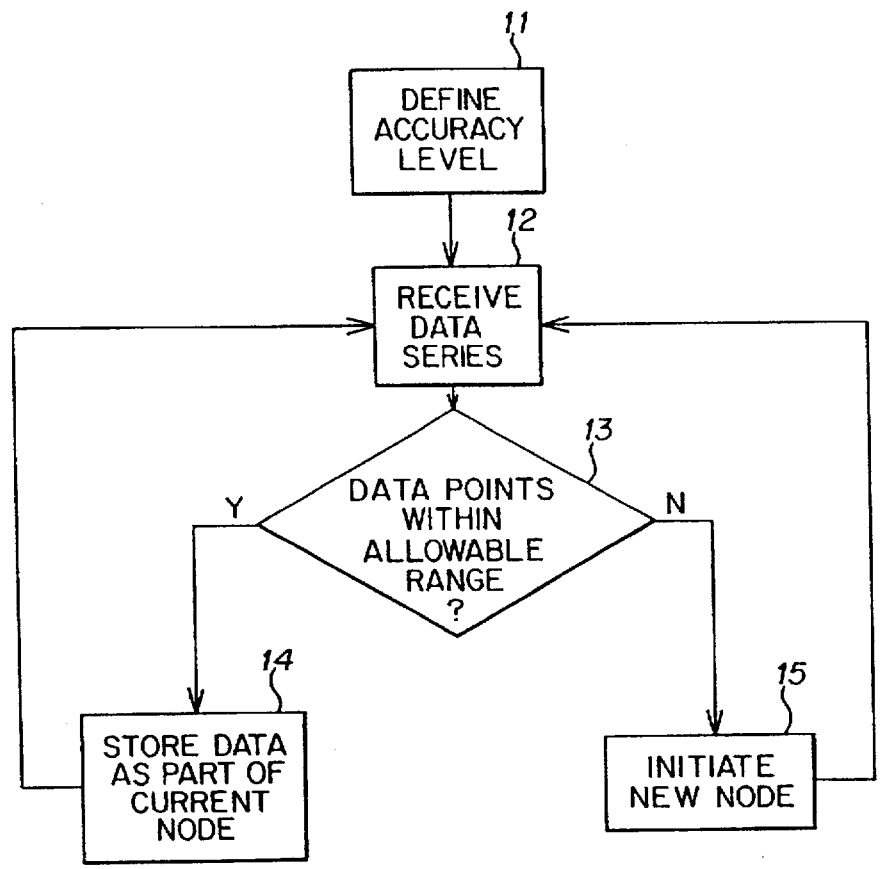
FIG. 2 is a flow chart illustrating generally a method of the present invention for storing compressed data.

FIG. 2 illustrates a flow chart for an embodiment of the invention. Step 11 defines the accuracy level to which the data will be compressed, which in turn defines an allowable range. In step 12, the data series is received, preferably one data point at a time. For each data point, step 13 determines whether the data point is within the allowable range. If the data point is within the allowable range, then the data is stored as part of a current segment (node) as depicted by step 14. If step 13 determines that a data point is not within the allowable range, then a new compressed node is initiated as shown in step 15. Thus, each compressed node corresponds to a segment of the data series, such as the segments 81, 82, and 83 as shown in FIG. 1.

Figure 3:
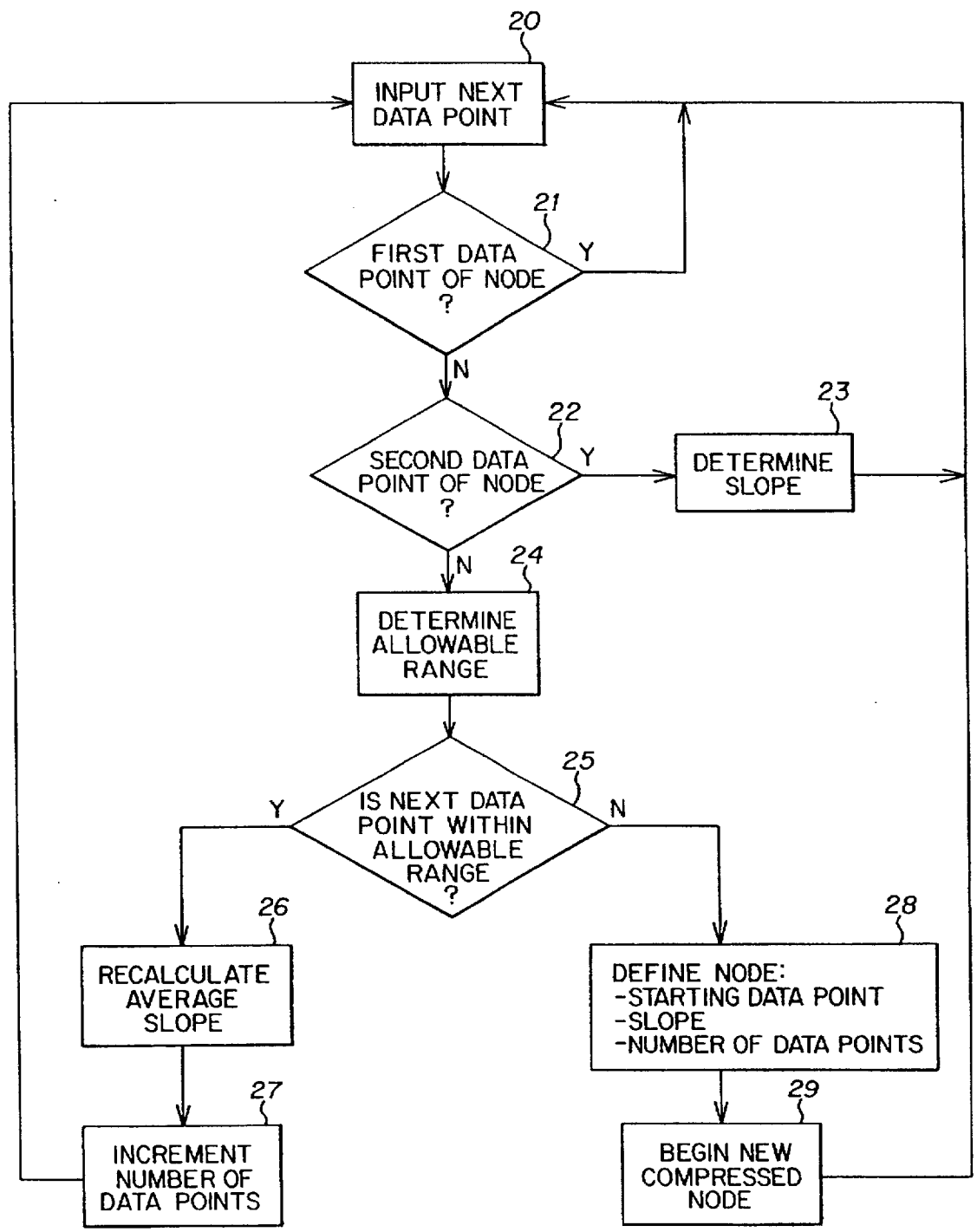
FIG. 3 is a more detailed flow chart of the data storage mechanism.

FIG. 3 shows more detail of the data storage mechanism. Step 20 inputs the next data point. If step 21 determines that the next data point is the first of the node, then step 20 inputs another data point. If step 22 determines that the next data point is the second of the node, then step 23 calculates the slope between the first and second data points. This slope is called the "current slope". Additionally, a value called the "current average slope" is also initialized to be the slope between the first and second data points. For the next data point (i.e., not the first or second of the node), step 24 calculates the allowable margin for the next data point, by extrapolating the current average slope to a next predicted point, and defining the allowable margin to be the multiplication product of the current average slope and 100 minus the accuracy level, divided by 100.

The allowable range is then the range from the next predicted point minus the allowable margin, to the next predicted point plus the allowable margin. In other words, the difference between the accuracy level and 100 is the percentage of the current average slope that is equal to the allowable margin. The accuracy level may be input by a user or external device, or alternatively a default accuracy may be used. Normally, the accuracy level will be set to a value between 0 and 100, where an accuracy level of 100 means that the data is reproduced exactly.

Step 25 evaluates whether the next data point is within the allowable range determined in step 24. If the data point is within the allowable range, then step 26 recalculates the current average slope based on the next data point and the previous current average slope. For successive data points, the current average slope is determined to be a rolling average of the slopes between each adjacent pair of data points. For example, the current average slope after two data points are received is the slope between the two data points. When a third data point is received, the slope between the second and third data points is determined, and the current average slope is then determined to be the average of: the slope between the first and second data points, and the slope between the second and third data points.

Step 27 increments the number of data points for the current compressed node, and step 20 receives the next data point. In the event that the next data point is not within the allowable range as determined within step 24, then step 28 ends and defines the current compressed node. Each compressed node is defined by three elements: the starting point (the first data point within the compressed node); the current average slope; and the number of data points within the compressed node. Following step 28, step 29 begins a new compressed node which begins with the current data point. A next data point may then be received as in step 20.

Figure 4:
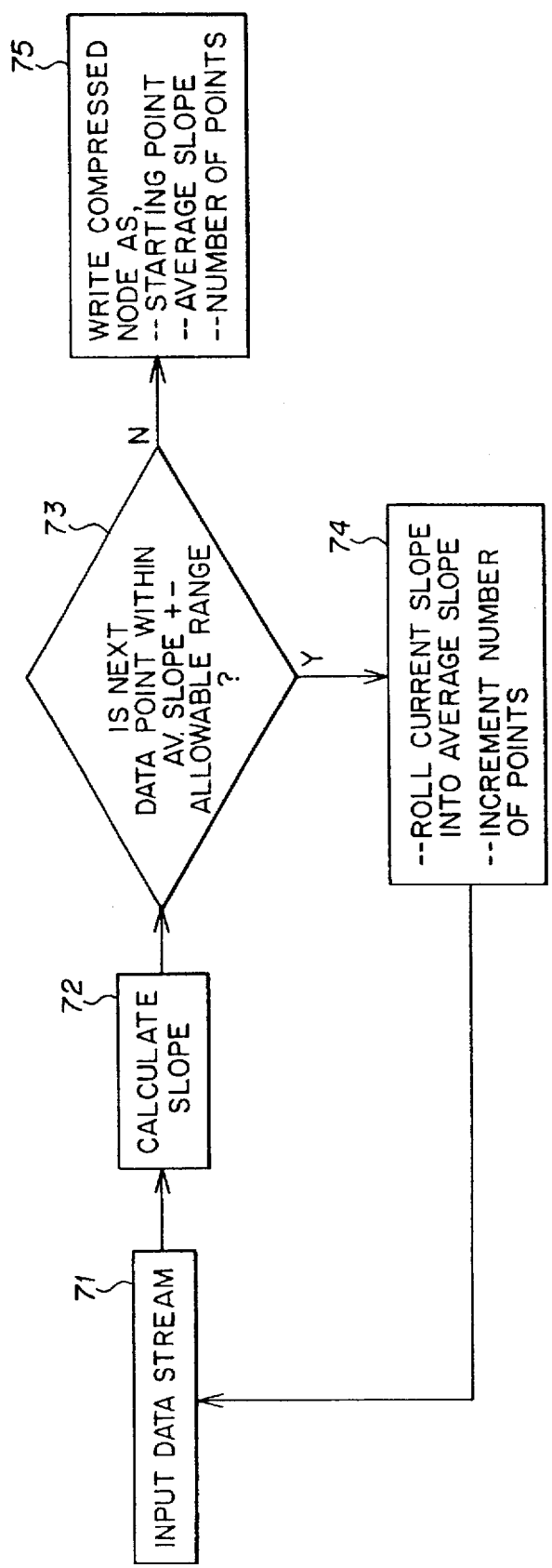
FIG. 4 depicts a process flow diagram of the invention.

FIG. 4 is a simplified process flow diagram which summarizes the present embodiment of data compression. Step 71 receives the input data stream. Step 72 calculates the slope, so that step 73 can determine whether the next data point is within the allowable range. If the next data point is within the allowable range, then step 74 determines a new average slope from the current slope and the previous current slopes, and the number of data points within the segment is incremented. Alternatively, if step 73 determines that the next data point is not within the allowable range, the compressed node is finished and stored as a starting point, an average slope, and a number of data points stored by the compressed node 75.

Figure 5:
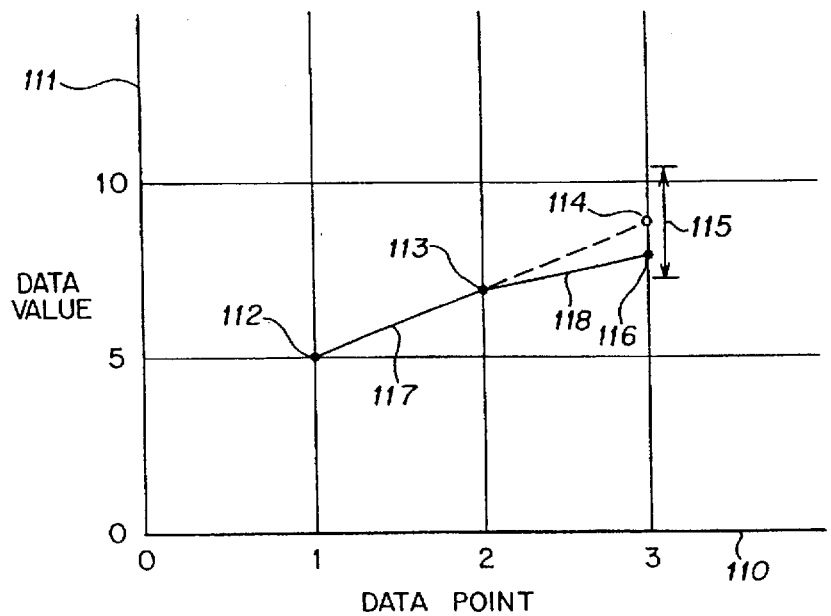
FIG. 5 depicts a graphical representation of the data compression, according to the invention.

A graphical example of the data compression is depicted in FIG. 5. The x-axis 110 represents the data point being received, while the y-axis 111 represents the value of each data point. In this example, the first data point 112 has a value of 5. The second data point 113 has a value of 7. Thus, the first current slope 117 between these two adjacent points is (5–7)/1=2. Therefore, the current average slope is initialized to 2. The next predicted point 114 would be the extrapolation of the current average slope, which would be at the value of 9. If an accuracy level of 100 were specified, then the segment would continue only if the next data point were exactly 9, since any other value would fall outside of the allowable range. However, if an accuracy level such as 25 had been specified, then the allowable range 115 for the third data point would be from:

$$9-(2*(100-25)/100)=7.5$$

to:

$$9+(2*(100-25)/100)=10.5,$$

based on a current average slope of 2.

Since in this example, the third data point 116 has a value of 8, it falls within the allowable range. The second current slope 118 is $(8-7)/1=1$, and the current average slope is now determined to be $(2+1)/2=1.5$. This new value of the current average slope then determines the allowable range for the fourth data point.

Figure 6:
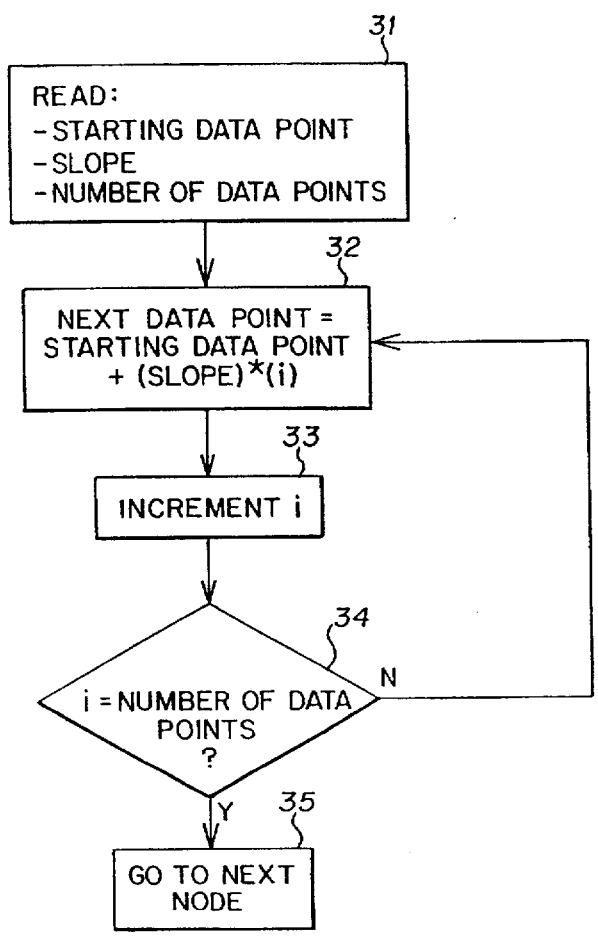
FIG. 6 is a flow chart illustrating the reproduction or decompression of the compressed data, according to the invention.

FIG. 6 depicts reproduction of the compressed data. For each compressed node, step 31 reads the value of the starting data point, the value of the current average slope, and the number of data points in the node. Step 32 reproduces each data point, by multiplying the slope by "i" and adding the resulting product to the first data point, where i is a monotonically increasing whole number which represents the relative placement of the specific data point within the node which is being reproduced. The value for i is initialized to zero for the first data point. Step 33 increments i, and step 34 determines whether i is equal to the number of data points in the node. If not, step 32 continues the decompression. If i is equal to the number of data points in the node, then the decompression of the node is complete, and step 35 continues to the next node to be decompressed.

Pseudo code for an embodiment of the compression method is as follows (where the current data point is identified as the "in data point"):

```
accept the next data point as in_data_point;
allowable_margin = current_average_slope *
   (100 - accuracy_level) / 100;
allowable_range is from:
     last_data_point + current_average_slope +
     allowable_margin
to:
     last_data_point + current_average_slope -
     allowable_margin;
if in_data_point is within allowable_range, then:
     current_slope = difference between in_data
     point and last_data_point;
     current_average_slope = average of current
     slope and all previous current slopes of
     same node;
     increment the number of data points by 1;
else:
     store the compressed node, consisting of
     the first data point in the node,. the
     current_average_slope, and the number of
     data points stored by the node;
     begin a new compressed node, with the
     in_data_point as the starting point.
```

A pseudo code description of the reproduction process is as follows:

```
read the next compressed node;
for (i=0 to number_of_data_points):
     reproduced_data_point = starting_data_point
     + (current_average_slope*i),
     write reproduced_data_point.
```

In summary, the present method embodiment utilizes linear equations for reducing a series of data points into corresponding compressed data nodes. Each data node is expressed as an equation of the form y=mx+b, where m is the slope and b is the first data point in the data node. Also stored is the number of data points. Each data point is represented by the value of y in the equation, where x is equal to 0 for the first data point, 1 for the second data point, 2 for the third data point, etc. In a reproduction process, x is equal to i, and i is incremented for each reproduced data point.

In other embodiments, non-linear equations may be implemented and/or the data may be compressed as several different types of equations. Any equation of the form y=f(x) may be implemented. Examples of such equations are: $y=\sin(x)$; $y=\cos(x)$; $y=C_{(n)}x^{(n)}+C_{(n-1)}x^{(n-1)} \ldots +C_1x+C_0$; $y=\ln(x)$; $y=e^x$; etc. In non-linear equations, the allowable range would normally be related to a parameter of the equation other than a slope. For example, the allowable range may be a percentage of the current data point.

The number of data points compressed into any one node depends upon the regularity of data values, and can vary from at least two to an indefinite number of data points. Each node contains enough information so that all of the original data points contained in the compressed node can be reproduced, within a specified range of accuracy. Multiple accuracy values can be specified at the beginning of the compression process, and several sets of compressed nodes may be generated, each corresponding to a different accuracy level. The default accuracy may be 100%, so that in the absence of specified accuracy levels, each of the reproduced data values will match the corresponding original data value exactly.

Figure 7:
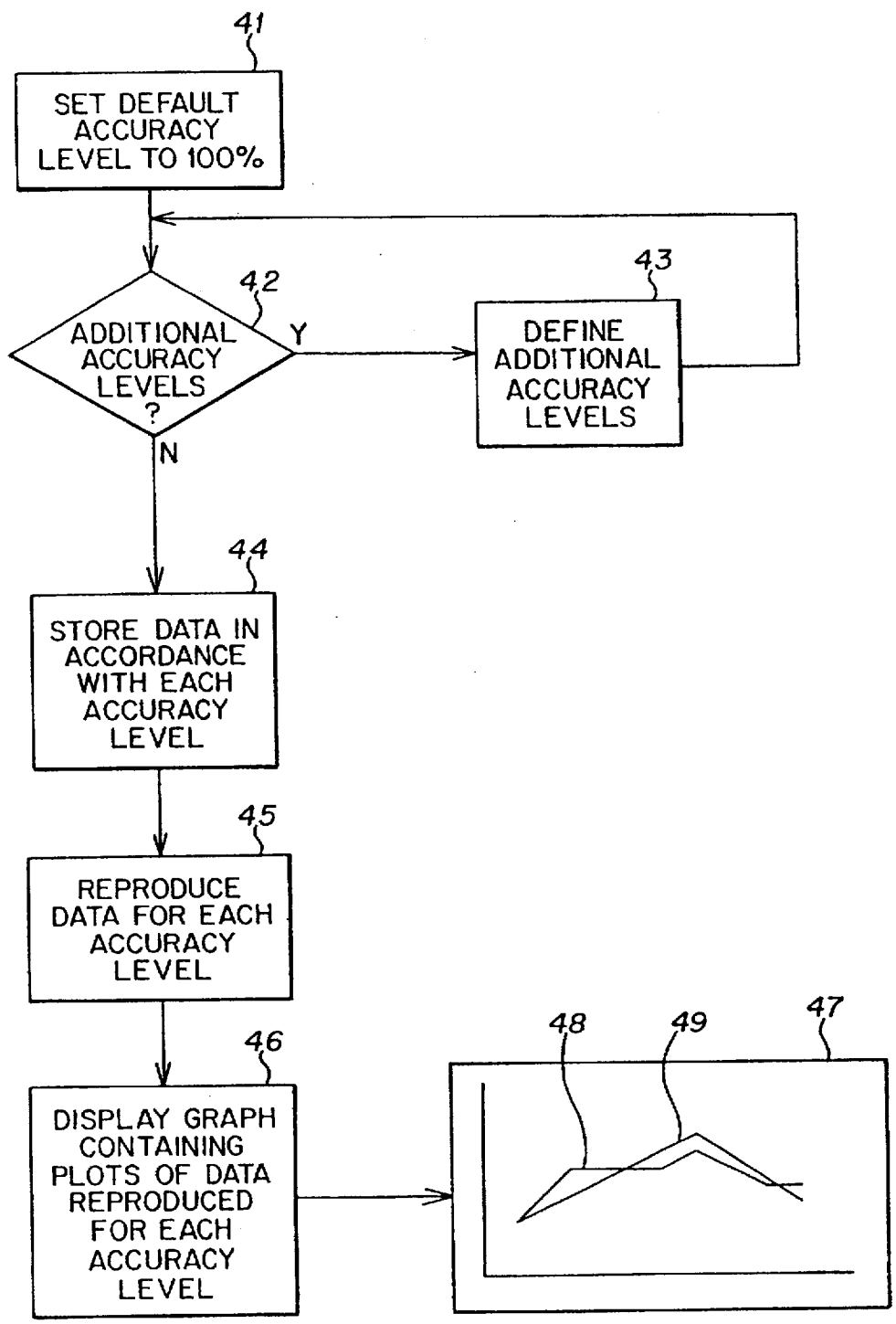
FIG. 7 is a flow chart showing another embodiment in which multiple sets of compressed data are stored and displayed.

A further embodiment is illustrated in FIG. 7. Here, instead of storing the data with only a single accuracy level, multiple versions of the data are stored with different accuracy levels. In step 41, the default accuracy is set to 100%, although it is not necessary to have a default. Step 42 determines whether additional accuracy levels are required. If they are required, step 43 defines them. The data is then stored in step 44 in accordance with each required accuracy level. In step 45, the data is reproduced for each required accuracy level. Step 46 creates a graphical display which contains plots of data reproduced for each required accuracy level. Display 47 shows two such sets of data, one exemplary set of data 48 at a 90% accuracy, and another set of data 49 at a 80% accuracy. In this manner, a user or external device may evaluate the alternative accuracy levels.

Figure 8:
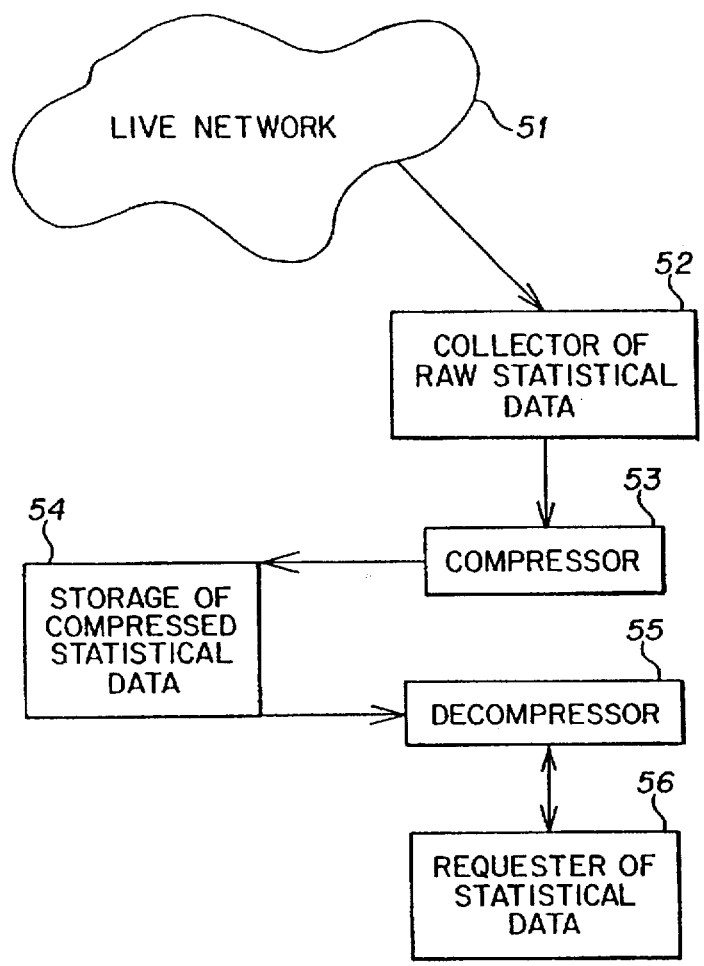
FIG. 8 shows another embodiment in which data compression is performed on network statistical data.

FIG. 8 shows an embodiment of the invention in which data compression is performed on network statistical data. A collector of raw statistical data 52 (e.g., network management software running on a workstation) is connected to a live network 51. The collector 52 passes the data to a compressor 53, which compresses the data described above. The compressor 53 stores the data in a storage element 54, and a decompressor 55 decompresses the data, and makes it available to a requestor of statistical data 56 (i.e. a user or the network management software).

Figure 12:
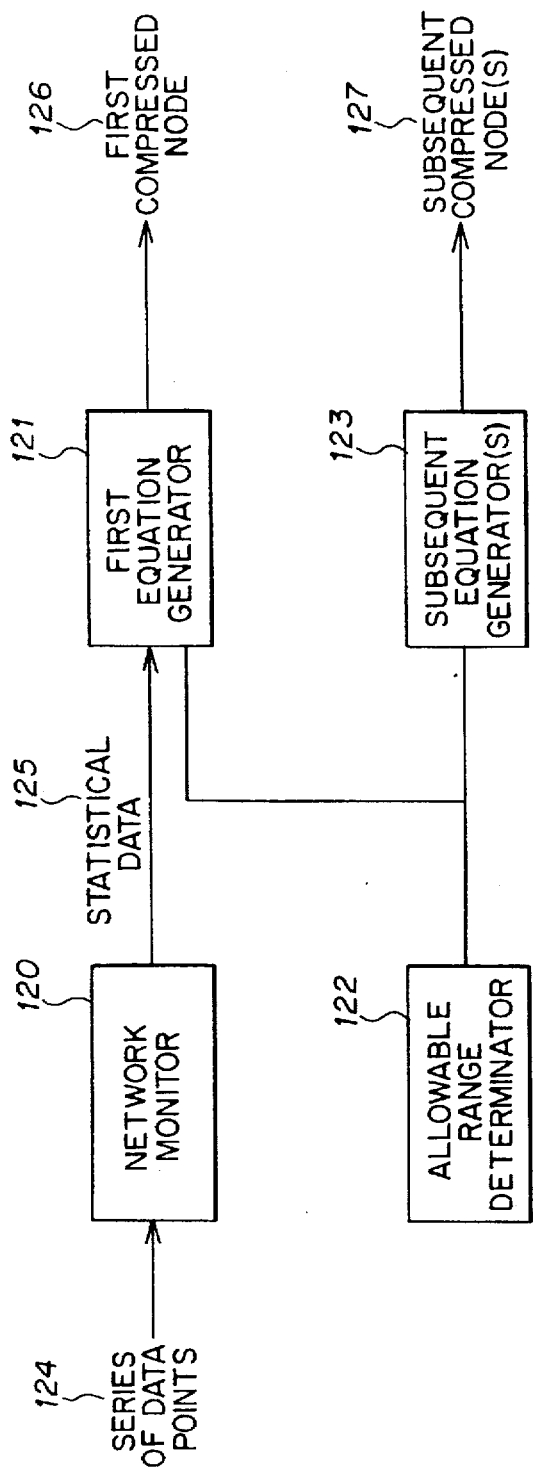
FIG. 12 shows one particular embodiment of the invention.

FIG. 12 shows an embodiment of the invention, including an apparatus for compressing a series of data points 124, the apparatus comprising a first equation generator 121 that determines a first equation which represents a first plurality of data points from the series 124 and that stores the first equation as a first compressed node, the slope of the first equation being an average of a plurality of slopes, each of the plurality of slopes being a slope between two adjacent data points of the first plurality of data points. The embodiment shown in FIG. 12 also includes an allowable range determinator 122 that determines an allowable range for a next data point in the series of data points based upon the first equation, and subsequent equation generator(s) 123, coupled to the first equation generator 121 and the allowable range determinator 122, that determines a second equation that represents a second plurality of data points and that stores the second equation as a subsequent compressed node 127 when a next data point is outside the allowable range.

Also shown in FIG. 12 is a network monitor 120, coupled to the first equation generator 121 and the subsequent equation generator 123, that monitors a network for statistical data 125 and that provides the statistical data 125 to the first equation generator 121 and the subsequent equation generator 123.

Figure 13:
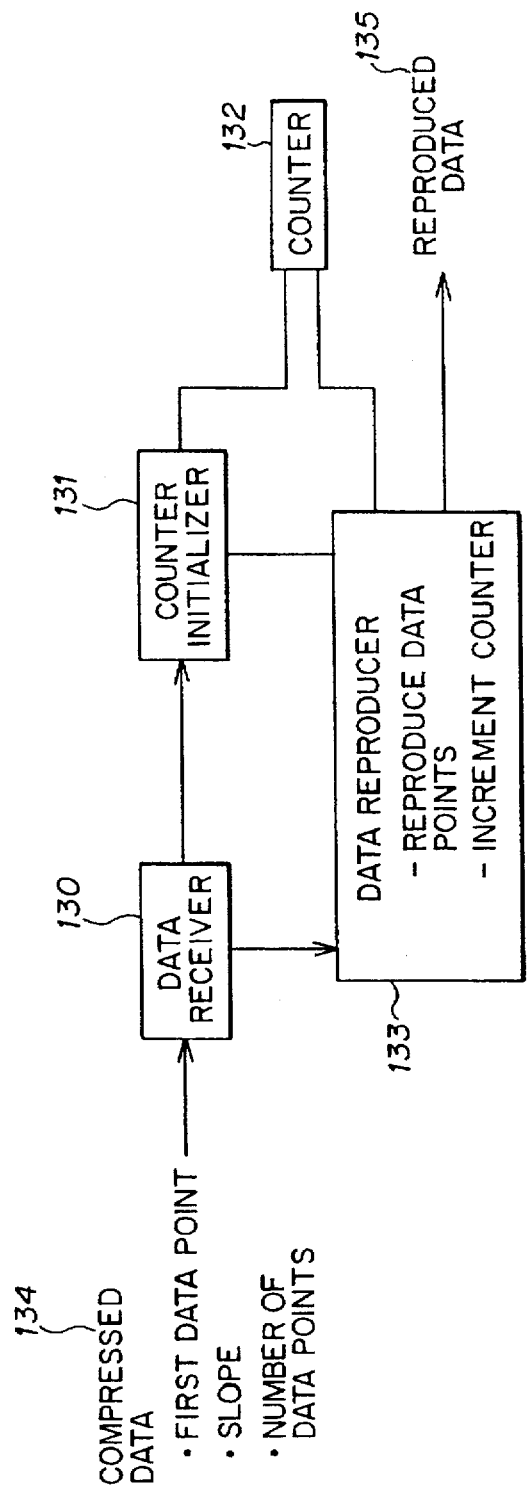
FIG. 13 shows another particular embodiment of the invention.

FIG. 13 shows another embodiment of the invention, including an apparatus for reproducing a series of original data points from compressed data 134, the apparatus comprising a data receiver 130 that receives the compressed data 134, the compressed data including a first data point, a slope of an equation which represents a plurality of original data points from the series, and the number of data points represented by the equation. Also shown in FIG. 13 is a counter 132 and a counter initializer, coupled to the data receiver 130, for initializing the counter 132 to zero. Additionally, FIG. 13 shows a data reproducer 133, coupled to the data receiver 130 and the counter initializer 131, that determines a reproduced data point 135 to be a sum of the first data point an a product of the counter multiplied by the slope, and that incrementa the counter 132 by one when the counter is less than the number.

Figure 14:
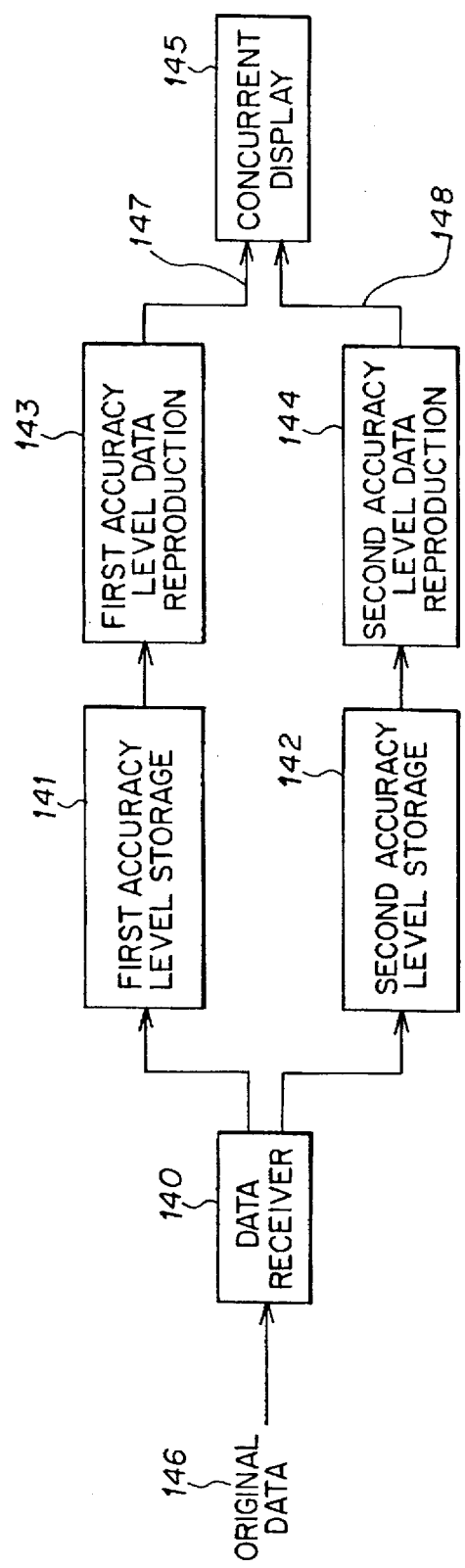
FIG. 14 shows yet another particular embodiment of the invention.

FIG. 14 shows another embodiment of the invention, directed to an apparatus for compressing data with a plurality of accuracies, comprising a data receiver 140 that receives original data 146, a first accuracy level storage 141, coupled to the data receiver 140, that stores the original data in a first compressed format with a first accuracy level, and a second accuracy level storage 142, also coupled to the data receiver 140, that stores the original data in a second compressed format with a second accuracy level. FIG. 14 also shows a first accuracy level data reproducer 143, coupled to the first accuracy level storage 141, that reproduces the original data from the first compressed format, to create a first reproduced data set 147, and a second accuracy level data reproducer 144, coupled to the second accuracy level storage 142, that reproduces the original data from the second compressed format, to create a second reproduced data set 148. FIG. 14 also shows a concurrent display 145, coupled to the first accuracy level data reproducer 143 and the second accuracy level data reproducer 144, that displays the first reproduced data set and the second reproduced data set concurrently.

Figure 9:
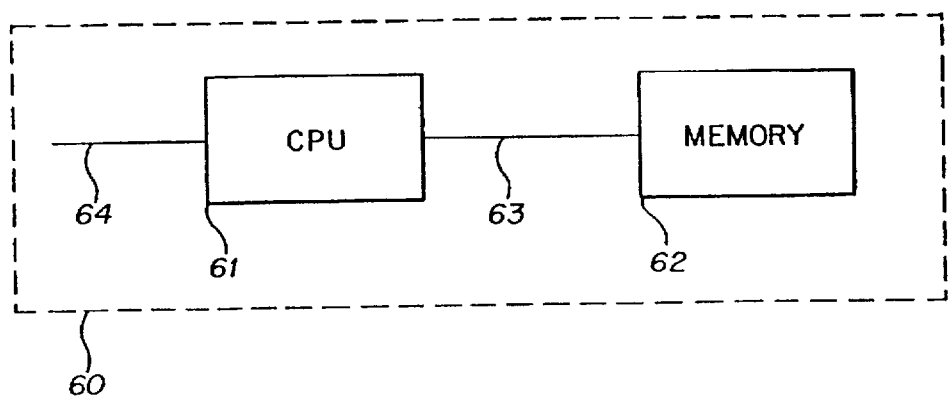
FIG. 9 shows a general purpose computer and memory, for alternative apparatus embodiments.

Any of the above embodiments may be implemented in a general purpose computer 60 as shown in FIG. 9. This general purpose computer may include a Computer Processing Unit (CPU) 61, memory 62, a processing bus 63 by which the CPU can access the memory 62, and access to a network 64.

In alternative embodiments, the invention may be a computer apparatus which performs the functions of any of the previous embodiments. Alternatively, the invention may be a memory 62, such as a floppy disk, compact disk, or hard drive, that contains a computer program or data structure, for providing to a general purpose computer instructions and data for carrying out the functions of the previous embodiments.

The memory savings of the invention is illustrated in FIGS. 10(a–c), which lists 140 individual data points, and FIG. 11, which lists compressed nodes corresponding to the 140 data points of FIGS. 10(a–c). Prior to the invention, these data points would have been stored in 140 separate locations in memory, as shown in FIGS. 10(a–c). Each data point corresponds to a particular attribute (in this case attribute #10089), for a monitor of statistical data (in this case Model 40051a).

FIG. 11 shows the same data contained in FIGS. 10(a–c), but stored in accordance with the invention. The compressed file contains data stored with a 100% accuracy level, so that an exact reproduction of the original data is attained. In this instance, the figures following the term "compressed node" show the first data point in the node and the slope of the node. The final number represents one less than the number of data points in each compressed node.

Having thus described several particular embodiments of the invention, various alterations, modifications, and improvements will readily occur to those skilled in the art. These are intended to be within the spirit and scope of this invention. Accordingly, the foregoing description is by way of example only, and not intended to be limiting.

What is claimed is:

1. A method for compressing a series of data points, the method comprising the steps of:

(A) determining a first equation which represents a first plurality of data points from the series and storing the first equation as a first compressed node, the slope of the first equation being an average of a plurality of slopes, each of the plurality of slopes being a slope between two adjacent data points of the first plurality of data points;

(B) determining an allowable range for a next data point in the series of data points based upon the first equation; and (C) when a next data point is outside the allowable range, determining a second equation which represents a second plurality of data points and storing the second equation as a second compressed node.

2. The method of claim 1, further comprising the step of reproducing the data points.

3. The method of claim 2, further comprising the steps of:
 monitoring a network for statistical data; and
 providing the statistical data as the plurality of data points.

4. The method of claim 1, wherein step A includes:
 storing a first data point of the first plurality of points, the first equation, and a number of data points in the first plurality of data points; and step C includes
 storing a first data point of the second plurality of data points, the second equation, and a number of data points in the second plurality of data points.

5. The method of claim 1, wherein the first equation and the second equation are linear equations.

6. The method of claim 5, wherein step A and C respectively include the steps of:
 receiving an accuracy level;
 determining a current slope for a current data point and a previous adjacent data point for each adjacent set of data points in the respective node;

determining a current average slope to be a rolling average of the previous current slopes;

determining the allowable range to be from $R_1$ to $R_2$ where:

$R_1$=(the current data point)+(the current average slope) +((the current average slope)×(100−accuracy level) /100));

$R_2$=(the current data point)+(the current average slope) −((the current average slope)×(100−accuracy level) /100)).

7. The method of claim 6, wherein the step of storing includes the steps of:

storing the first data point of the respective node;

storing the current average slope of the respective node; and storing the number of data points in the respective node.

8. The method of claim 7, further including steps for reproducing data, the reproduced data including a plurality of reproduced data points, the method further comprising the steps of:

a. initializing a counter to zero;

b. determining a reproduced data point to be a sum of the first data point and a product of the counter multiplied by the current average slope of the respective node;

c. incrementing the counter by one; and d. iterating step b and step c until the counter is equal to the number of data points in the respective node.

9. The method of claim 1, wherein:

step A includes determining a slope of the first equation; and step B includes determining the allowable range based upon the slope of the first equation and an accuracy level.

10. The method of claim 9, wherein step B includes the steps of:

extrapolating the first equation to determine a projected next data point value;

determining an allowable margin based upon the slope of the first equation and the accuracy level; and determining the allowable range to be a range from the projected next data point plus the allowable margin to the next projected data point minus the allowable margin.

11. A method for reproducing a series of original data points from compressed data, the method comprising the steps of:

a. receiving the compressed data, the compressed data including a first data point, a slope of an equation which represents a series of original data points, and the number of data points represented by the equation;

b. initializing a counter to zero;

c. determining a reproduced data point to be a sum of the first data point and a product of the counter multiplied by the slope;

d. incrementing the counter by one; and e. iterating step c and step d until the counter is equal to the number of data points represented by the equation.

12. A method for compressing data with a plurality of accuracies, comprising the steps of:

receiving original data;

storing the original data in a first compressed format having a first accuracy level;

storing the original data in a second compressed format having a second accuracy level;

reproducing the original data from the first compressed format, to create a first reproduced data set;

reproducing the original data from the second compressed format, to create a second reproduced data set; and displaying the first reproduced data set and the second reproduced data set concurrently.

13. The method of claim 12, wherein the first compressed format includes a first slope of a first equation, a first data point, a first number of data points defined by the first compressed format, and a first accuracy, and wherein the second compressed format includes a second slope of a second equation, a second data point, a second number of data points defined by the second compressed format, and a second accuracy, wherein the second accuracy is different from the first accuracy.

14. An apparatus for compressing a series of data points, the apparatus comprising:

first means for determining a first equation which represents a first plurality of data points from the series and for storing the first equation as a first compressed node, the slope of the first equation being an average of a plurality of slopes each of the plurality of slopes being a slope between two adjacent data points of the first plurality of data points;

second means for determining an allowable range for a next data point in the series of data points based upon the first equation; and third means, coupled to the first and second means, for determining a second equation that represents a second plurality of data points and for storing the second equation as a second compressed node when a next data point is outside the allowable range.

15. The apparatus of claim 14, further comprising means, coupled to the first and third means for determining, for reproducing the data points.

16. The apparatus of claim 14, further comprising means, coupled to the first and third means for determining, for monitoring a network for statistical data and for providing the statistical data to the first and third means for determining.

17. The apparatus of claim 14, wherein:

the first means includes means for determining a slope of the first equation; and the second means includes means for determining the allowable range based upon the slope of the first equation and an accuracy level.

18. The apparatus of claim 17, wherein the second means includes:

means for extrapolating the first equation to determine a projected next data point value;

means for determining an allowable margin based upon the slope of the first equation and the accuracy level; and means for determining the allowable range to be a range from the projected next data point plus the allowable margin to the next projected data point minus the allowable margin.

19. An apparatus for reproducing a series of original data points from compressed data, the apparatus comprising:

means for receiving the compressed data, the compressed data including a first data point, a slope of an equation which represents a plurality of original data points from the series, and the number of data points represented by the equation;

means, coupled to the means for receiving, for initializing a counter to zero; and reproducing means, coupled to the means for receiving and the means for initializing, for determining a reproduced data point to be a sum of the first data point and a product of the counter multiplied by the slope, and for incrementing the counter by one when the counter is less than the number.

20. An apparatus for compressing data with a plurality of accuracies, comprising:

means for receiving original data;

means, coupled to the means for receiving, for storing the original data in a first compressed format with a first accuracy level;

means, coupled to the means for receiving, for storing the original data in a second compressed format having a second accuracy level;

means, coupled to the first means for storing, for reproducing the original data from the first compressed format, to create a first reproduced data set;

means, coupled to the second means for storing, for reproducing the original data from the second compressed format, to create a second reproduced data set; and means, coupled to the first and second means for reproducing, for displaying the first reproduced data set and the second reproduced data set concurrently.

21. A memory device containing a computer program of instructions for a general purpose computer to compress data, the data comprising a series of data points, the memory device comprising:

first means for providing instructions for determining a first equation which represents a first plurality of data points from the series of data points, and for storing the first equation as a first compressed node, the slope of the first equation being an average of a plurality of slopes, each of the plurality of slopes being a slope between two adjacent data points of the first plurality of data points;

second means for providing instructions for determining an allowable range for a next data point in the series of data points based upon the first equation; and third means, coupled to the first and second means, for providing instructions for determining a second equation that represents a second plurality of data points and for storing the second equation as a second compressed node when a next data point is outside the allowable range.

22. The memory device of claim 21, further comprising means, coupled to the first and third means, for providing instructions for reproducing the data points.

23. The memory device of claim 21, further comprising means, coupled to the first and third means, for providing instructions for monitoring a network for statistical data and for providing the statistical data to the first and third means for providing instructions for determining.

24. The memory device of claim 21, wherein:

the first means includes means for determining a slope of the first equation; and the second means includes means for determining the allowable range based upon the slope of the first equation and an accuracy level.

25. The memory device of claim 24, wherein the second means includes:

means for extrapolating the first equation to determine a projected next data point value;

means for determining an allowable margin based upon the slope of the first equation and the accuracy level; and means for determining the allowable range to be a range from the projected next data point plus the allowable margin to the next projected data point minus the allowable margin.

26. A memory device containing a computer program of instructions for a general purpose computer to reproduce a series of original data points from compressed data, the memory device comprising:

a first means for providing instructions for receiving the compressed data, the compressed data including a first data point, a slope of an equation which represents a plurality of original data points from the series, and the number of data points represented by the equation;

a second means, coupled to the first means, for providing instructions for initializing a counter to zero;

a third means, coupled to the first and second means, for providing instructions for determining a reproduced data point to be a sum of the first data point and a product of the counter multiplied by the slope, when the counter is less than the number of data points represented by the equation.

27. A memory device containing a computer program of instructions for a general purpose computer to compress data with a plurality of accuracies, the memory device comprising:

first means for providing instructions for receiving original data;

second means, coupled to the first means, for providing instructions for storing the original data in a first compressed format having a first accuracy level;

third means, coupled to the first means, for providing instructions for storing the original data in a second compressed format having a second accuracy level;

fourth means, coupled to the second means, for providing instructions for reproducing the original data from the first compressed format, to create a first reproduced data set;

fifth means, coupled to the third means, for providing instructions for reproducing the original data from the second compressed format, to create a second reproduced data set; and sixth means, coupled to the fourth and fifth means, for providing instructions for displaying the first reproduced data set and the second reproduced data set concurrently.

* * * * *